United States Patent Office 3,533,764
Patented Oct. 13, 1970

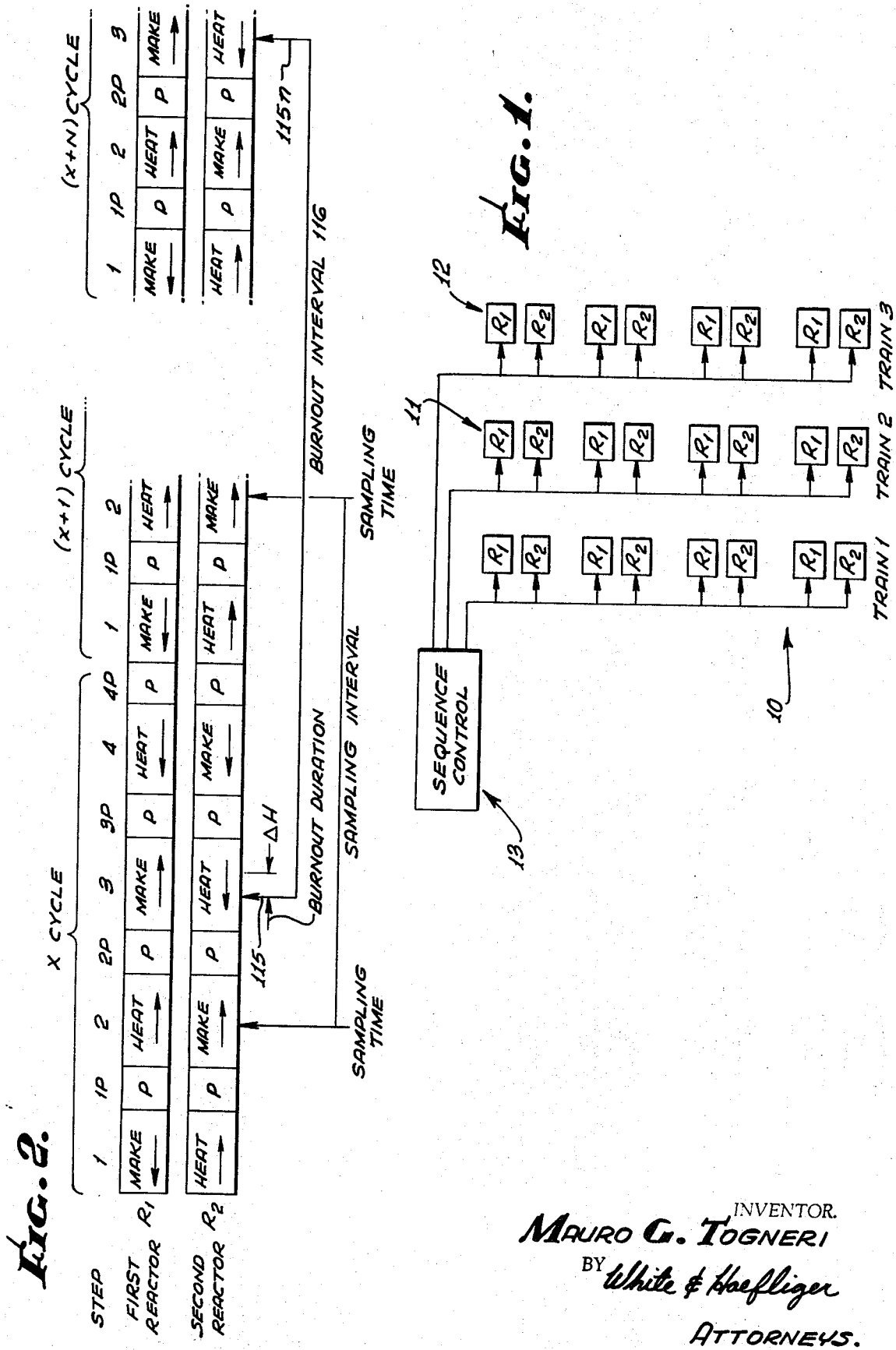

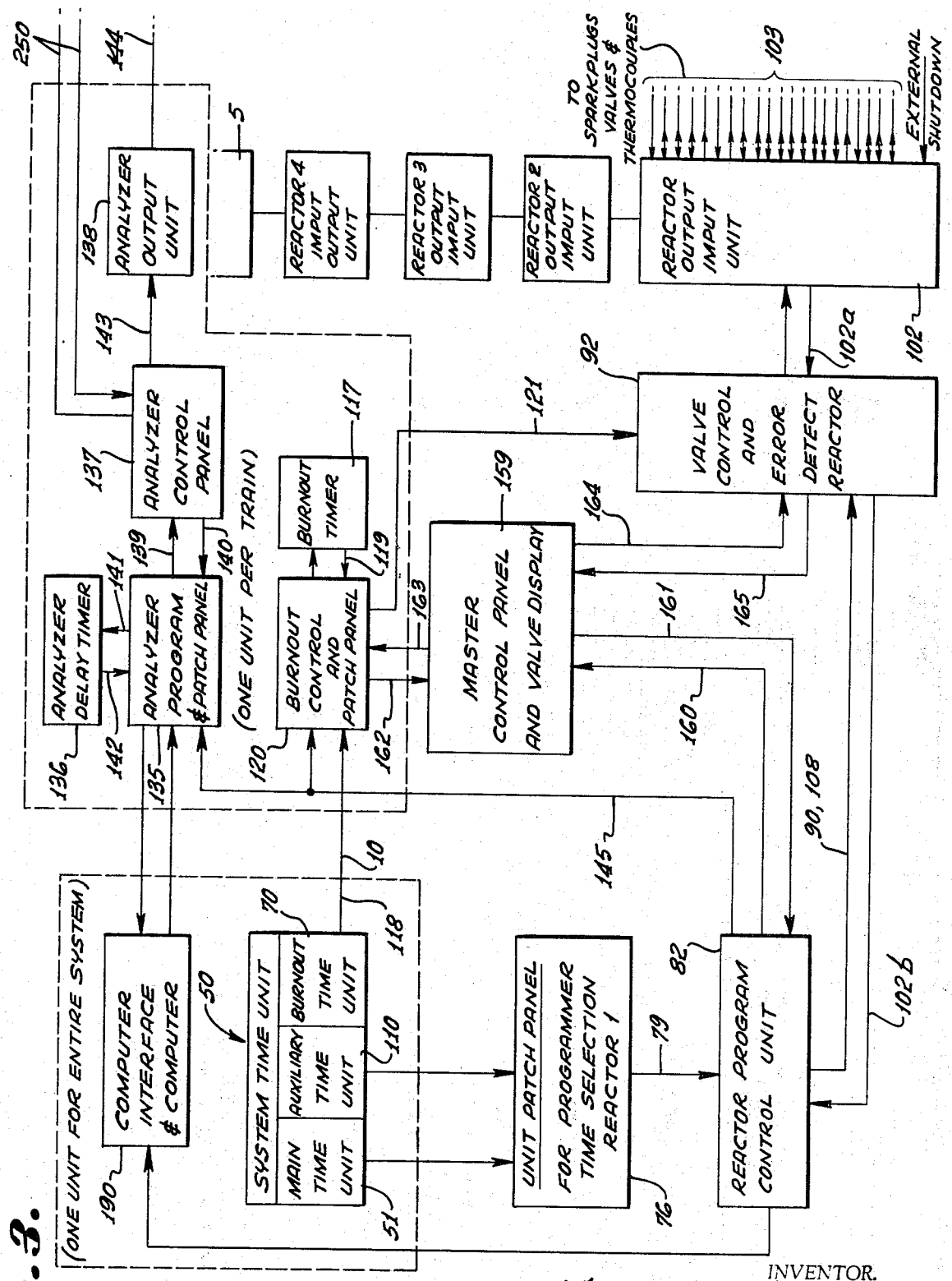

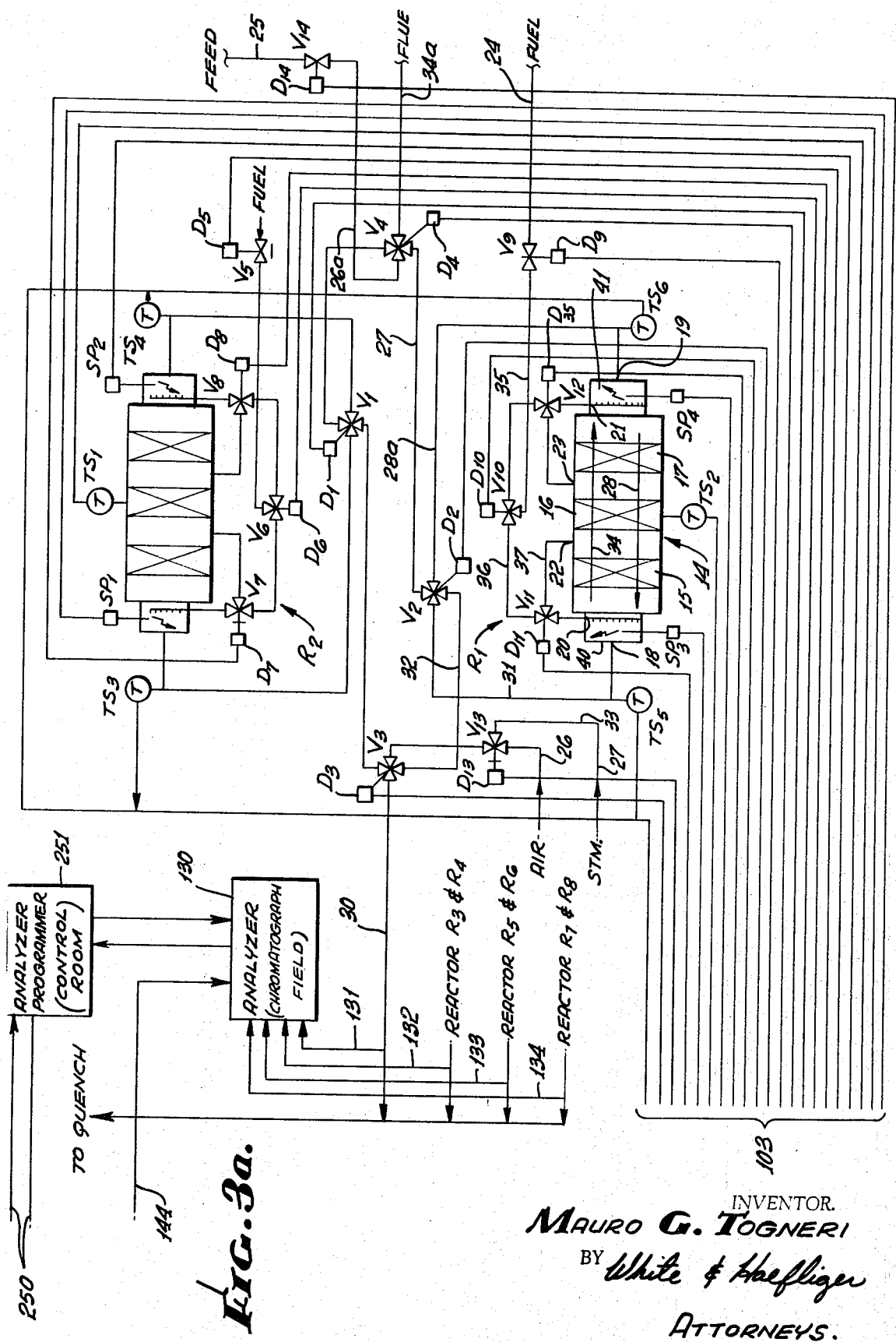

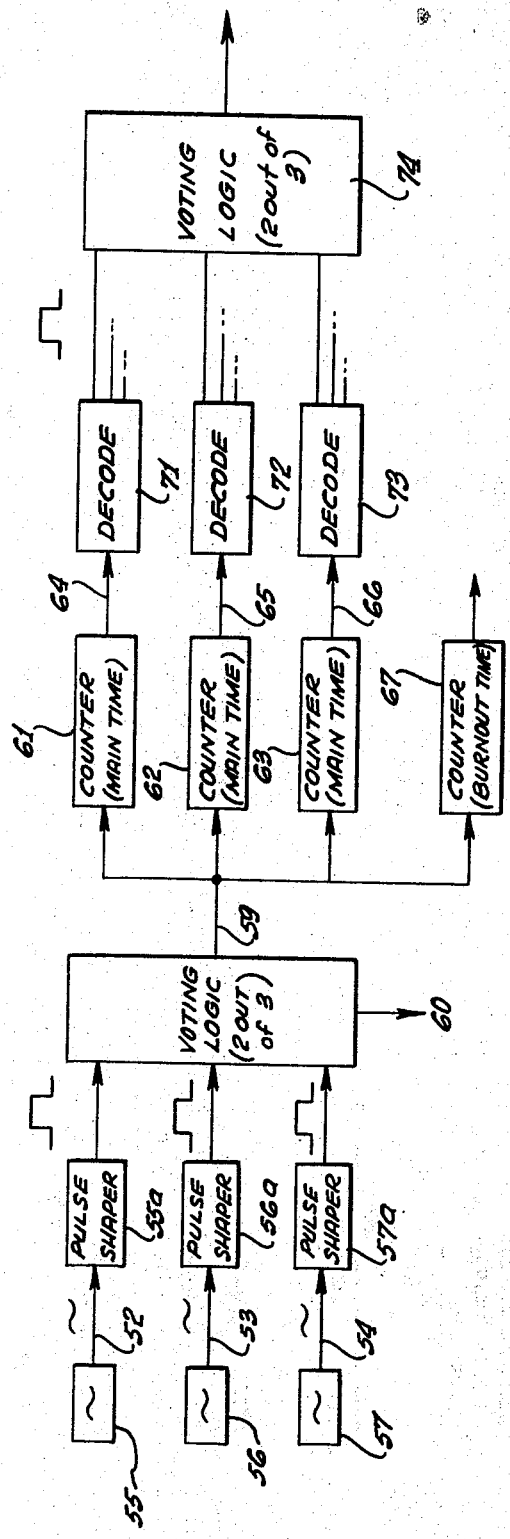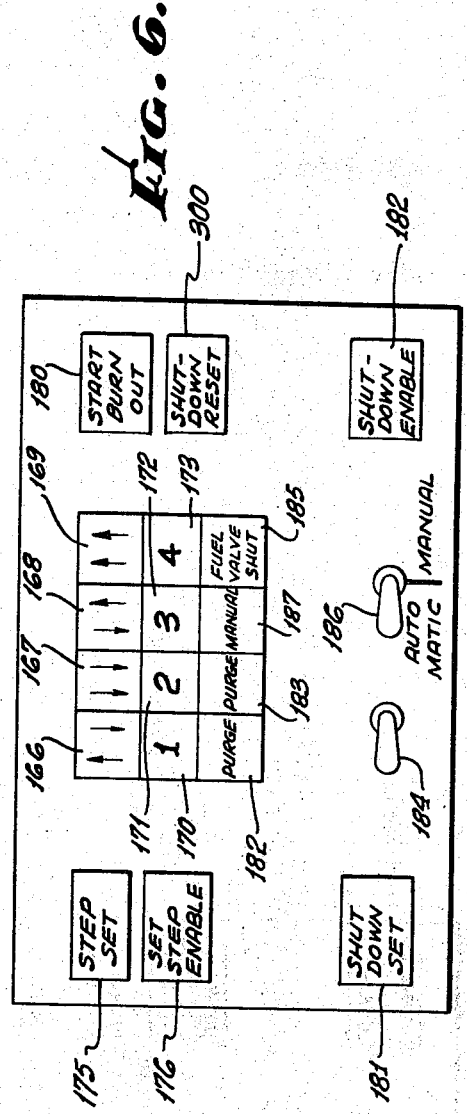

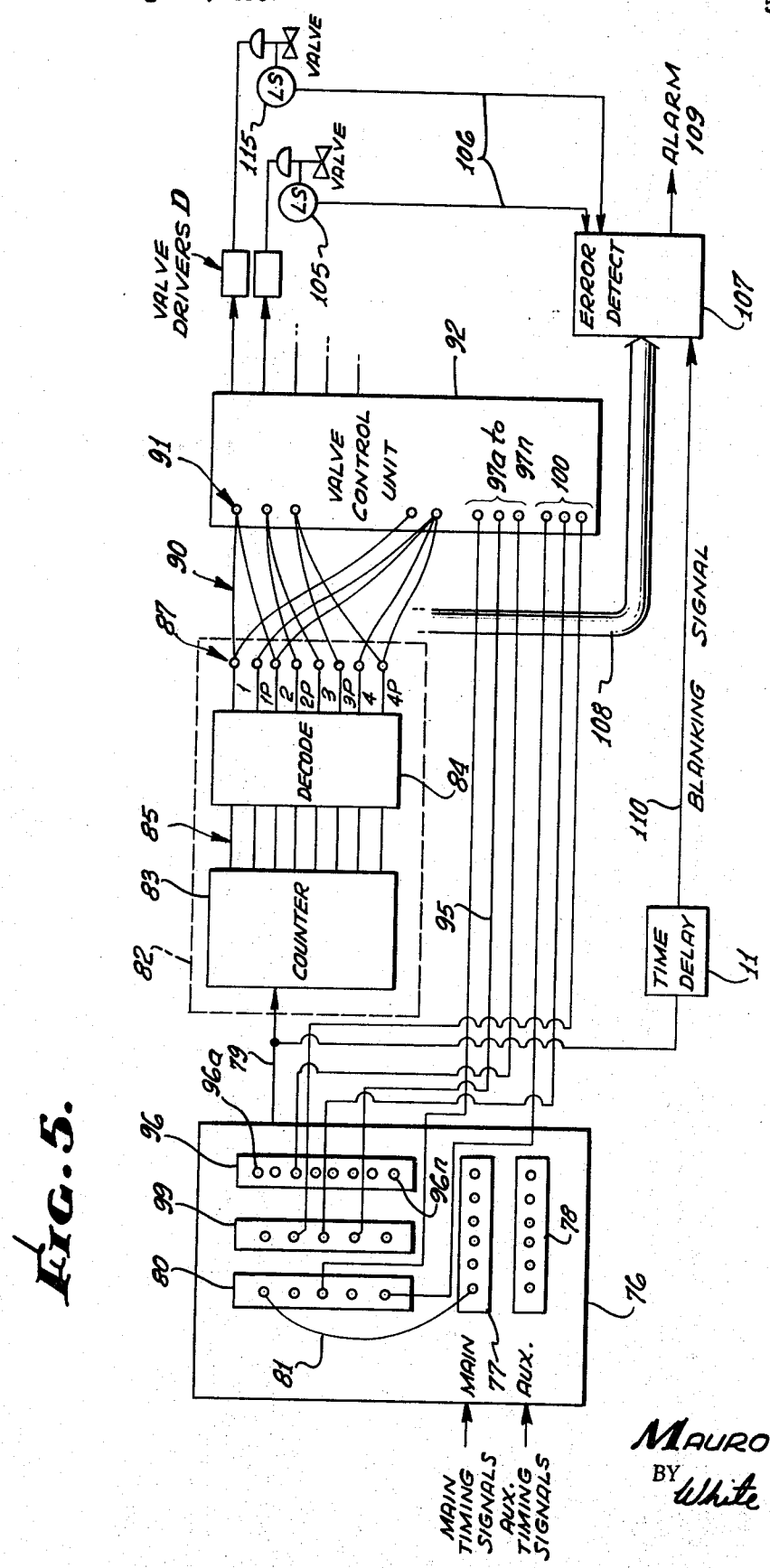

3,533,764
REACTOR CONTROL SYSTEM
Mauro G. Togneri, Houston, Tex., assignor to The Fluor Corporation, Ltd., Los Angeles, Calif., a corporation of California
Filed Aug. 15, 1967, Ser. No. 660,751
Int. Cl. G06f 15/46
U.S. Cl. 48—61                   8 Claims

ABSTRACT OF THE DISCLOSURE

Electronic sequence control system for multiple reactor pairs, resulting in accurate integration of multiple functions such as error detection, burnout control and sample analysis control and selection, and enabling system automatic control and manual control of selected reactor stepping times within system master cycles.

BACKGROUND OF THE INVENTION

This invention relates generally to process control, and more particularly concerns automatic mode and manual mode control of multiple pairs of reactors stepped through process cycles in staggered relation, and in such manner as to accommodate certain additional control functions as will be described.

To my knowledge, past reactor pair control systems have lacked the degree of integrated and highly accurate control characteristic of the present invention, and including unusually advantageous combinations and subcombinations of interrelated features comprising provision for error detection as respects valve actuation; provision for reactor burnout initiated during a heating step and repeated at intervals embracing many cycles of reactor operation; provision for independent control of selected reactor pair timing; and provision for automatic analysis of product samples in such manner as to enable selection of the samples from different reactors at selected times during the process steps. Particularly is this true with respect to multiple reactor pairs of the specific type as will be described.

BRIEF DESCRIPTION OF THE INVENTION

It is a major object of the present invention to provide an electronic sequence control system for multiple reactor pairs as will be described, and producing unusually beneficial results in terms of accurate integration of multiple function such as error detection, burnout control and sample analysis control and selection, and enabling system automatic control and manual control of selected reactor stepping times within system master cycles.

Basically, the environment of the invention includes multiple pairs of reactors, each reactor having valve controlled inlets and outlets for fuel, feed, product and purge fluids; and the sequencer system of the invention causes the valves to step through a sequence of configurations in each of repeated operating cycles, the configurations characterized in that the first and second reactors respectively receive fuel (HEAT) and feed (MAKE) in a first step interval in the cycle; both reactors receive purge gas in a purge interval following the first step; the first and second reactors respectively receive feed and fuel in a second step interval in the cycle; and both reactors receive purge gas in a purge interval following that second step interval. The sequencer system includes a main time unit providing main timing signals for defining the step intervals and the cycles; programmer means including counter and decoder apparatus connected to be responsive to the main timing signals for generating stepping signals; operator means responsive to the stepping signals to operate the valves to assume the mentioned configurations; and error detection means responsive to valve positioning and to versions of the signals to indicate whether valves have or have not assumed their intended configurations. Typically, the error detection means includes valve movement limit switches from which electrical outputs are derived when the valves have assumed their intended configurations, together with circuitry to ascertain absence of correspondence between the step signal and the limit switch outputs, the circuitry being disabled during valve movement to final configuration corresponding to the new step. This may be accomplished in an unusually advantageous manner as to also assure proper-functioning of the programmer means and valve operator means, as will be seen, for enhanced safety.

Another important aspect of the invention concerns the provision of multiple combinations of reactor pairs, the main time unit providing the main timing signals for all reactors; an auxiliary timer unit to provide auxiliary timing signals, and a patch panel associated with each pair of reactors and having separate input terminals for the main and auxiliary timing signals, each panel having an output terminal electrically connected with its associated step signal generating means, and each panel including patch connection means connectible between the output terminal and either of the main and auxiliary timing signal input terminals. Accordingly, the main timing cycles may be varied, and the step intervals within the selected main cycle may be varied as respects any reactor pair, as will be seen.

A further aspect of the invention has to do with supply of burnout fuel to be combusted in each reactor, such supply typically being effected through controllable burnout valving. In this regard, primary burnout timing means is provided in association with the main time unit and operable to provide primary timing signals representative of multiple cycle embracing intervals between burnout initiations occurring during the first and second steps as mentioned; secondary burnout timing means provide secondary timing signals representative of the duration of burnout in the first and second steps; and control means responsive to such burnout timing signals operates the burnout fuel control valving. As will be seen, burnout initiation and duration may be made adjustable by means of patch panel means to be described.

A still further aspect of the invention concerns the provision of an analyser for analysing samples of product fluid outputs of the different reactors, and analyser control means responsive to the stepping signals to control insertion of such samples in the analyser at predetermined times during selected steps.

These and other objects and advantages of the invention, as well as the details of illustrative embodiments, will be more fully understood from the following detailed description of the drawings, in which:

FIG. 1 is a block diagram showing multiple trains of reactor pairs, all controlled by a sequencer;

FIG. 2 is a sequencing event or timing diagram;

FIG. 3 and 3a are block diagrams showing details of the sequence control as related to a reactor pairs;

FIG. 4 is a block diagram illustrating timing signal generation;

FIG. 5 is a block diagram illustrating patch panel, reactor programming unit and valve control unit connections, as well as provisions for error detection; and FIG. 6 is a view showing the system master control panel.

DESCRIPTION OF THE PREFERRED EMBODIMENT REACTOR SYSTEM

Referring first to FIG. 1, three trains of reactors, also referred to as funaces, are indicated at 10, 11 and 12, the reactors occurring in pairs $R_1$ and $R_2$ in each train. Also, a common sequence control, indicated generally at 13, functions to control the operation of the reactor pairs, as will be described.

Referring to FIG. 3a, each of the reactors $R_1$ and $R_2$ includes an elongated chamber 14 containing porous brickwork extending laterally across the chamber at three zones 15–17. The chamber also has end ports at 18–21 and side ports at 22 and 23. Each pair of reactors has associated sources of supply of fuel gas 24, reactant feed gas 25 (such as ethane, propane, or naphtha vapor), air 26, and purge gas 27 (such as steam). Considering the operating cycle of reactor $R_1$, it embodies four main steps separated by purge steps, as also represented in FIG. 2 along with the associated operation of the companion reactor $R_2$. Thus step 1 involves a "MAKE" or reaction within the hot reactor, during which reactants (such as feed gas and air) flow in the direction 28. Such feed is supplied from source 25 via lines 26a, four-way valving $V_4$, line 27a, four-way valving $V_2$, line 28a and port 19. The reaction may for example involve cracking of a hydrocarbon feed gas at the high temperature brickwork zones 15, 16 and 17 in the reactor. Product gas exits from the reactor at 18 and flows to the delivery line 30 via line 31, valve $V_2$, line 32 and four-way valves $V_3$.

Following the MAKE step, purge gas is passed to the reactor, as from source 27, and via line 33, valve $V_{13}$, valve $V_3$, line 32, valve $V_2$, line 28 and inlet 19. The purge gas, which may consist of steam, passes through the reactor in the direction of arrow 28, exits at 18, and flows to the flue 34a via line 31, valve $V_2$, line 27a, and valve $V_4$.

Step 2 in the operating cycle of reactor $R_1$ involves a HEAT interval. For this purpose, air is supplied via supply point 26, four-way valve $V_{13}$, four-way valve $V_3$, line 32, four-way valve $V_2$, line 31 and port 18 to flow in the direction of arrow 34. The air is preheated in passing through brickwork zone 15, and then mixes with fuel supplied to the reactor interior between zones 15 and 16 via inlet 22. Such fuel is supplied from point 24 via valve $V_9$, line 35, valve $V_{10}$, line 36, valve $V_{11}$ and line 37. The hot products of combustion flow through and heat the brickwork zones 16 and 17 to feed fluid reaction temperature, as for example hydrocarbon cracking temperature. Products of combustion exit from the reactor at 19 and flow to flue 34a via line 28a, valve $V_2$, line 27a and valve $V_4$.

Following the HEAT step, purge gas is again passed to the reactor via line 33, valve $V_{13}$, valve $V_3$, line 32, valve $V_2$, line 31 to inlet 18. Such gas passes through the reactor in the direction of arrow 34, exits at 19, and flows to flue point 34a via line 28a, valve $V_2$, line 27a and valve $V_4$.

Step 3 in the operating cycle involves a MAKE in the direction of arrow 34, and it is followed by a purge in the direction of arrow 34. Step 4 involves a HEAT in the direction of arrow 28, followed by a purge in that direction. This completes one cycle of operation, as indicated in FIG. 2, which also shows the interrelation of reactor $R_2$ steps occurring simultaneously with the steps of $R_1$. In reality eight discrete steps are involved as follows: 1–1P–2–2P–3–3P–4–4P. Considering only the Steps 1 to 4 and the states of the two reactors, they are summarized as follows:

|  | $R_1$ state | $R_2$ state |
| --- | --- | --- |
| Step 1 | MAKE NORTH | HEAT SOUTH. |
| Step 2 | HEAT SOUTH | MAKE SOUTH. |
| Step 3 | MAKE SOUTH | HEAT NORTH. |
| Step 4 | HEAT NORTH | MAKE NORTH. | where,

"HEAT" is defined as supply of air and fuel to a reactor for combustion therein, "MAKE" is defined as supply of reactant feed to a reactor for reaction therein, "NORTH" is defined as flow through the reactor in one direction, "SOUTH" is defined as flow through the reactor in the opposite direction.

Reactor $R_2$ has similar associated piping and valves $V_1$–$V_7$ operable in a sequence similar to that as described for reactor $R_1$, but in accordance with the sequence of states outlined in FIG. 2 and in the above tabulation. Referring again to $R_1$, at certain intervals, usually embracing many cycles of reactor operation, fuel and air are supplied to the reactor for burnout, which is made to occur during only a portion of the normal HEAT step for that reactor. See in this regard the time duration $\Delta H$ in FIG. 2. For this purpose, fuel is supplied to valve $V_{10}$ as described above, and then passed to the combustion zone 40 at one end of the reactor as via valve $V_{11}$ and port 20, or to the combustion zone 41 at the opposite end of the reactor as via valve $V_{12}$ and port 21. Air is also supplied to the selected combustion zone as via line 31 or 28a. During such supply of fuel and air, the combustion is initiated as by a spark plug $SP_3$ penetrating zone 40, or a spark plug $SP_4$ penetrating zone 41. The combustion is such that upon flow of the hot products and of hot air through the reactor hydrocarbons deposited on the brickwork are oxidized and removed, to be passed to flue. Similar burnout apparatus is associated with reactor $R_2$ as indicated in the drawings. Control of such burnout will be described later.

Finally, the reactors have associated thermocouples $TS_1$–$TS_6$ connected at the points shown (as for example $TS_5$ in line 31, $TS_6$ in line 28 and $TS_2$ in brickwork 16) to sense overheating. Also, the valves have associated drivers such as solenoid actuators indicated at $D_1$–$D_{14}$. It is these actuators that are controlled by the sequence control system to be described below.

SEQUENCE CONTROL SYSTEM

The system for sequence controlling the valves mentioned above includes what may be referred to as a system time unit indicated generally at 50 in FIG. 3, and incorporating a main time unit 51 providing highly accurate main timing signals to be used to define the successive cycles indicated at $X, X+1 \ldots X+n$ in FIG. 2, and each including the four HEAT and MAKE steps and intervening purge steps. More specifically, the main time unit is shown in FIG. 4 as including three parallel channels 52, 53 and 54 to which 60 cycle synchronized waveforms may be supplied as at 55–57. Connected in the channels are pulse shapers 55a–57a operating to produce square wave outputs applied to the voting logic circuitry 58, the latter operating to select for transmission at 59 an output wave corresponding to the two square waves most alike in phase or frequency. In the event no two square waves are sufficiently alike, the voting logic produces an alarm at 60.

The transmitted signal 59 is applied to the three counters 61, 62 and 63 in the parallel channels 64–66, as well as to a counter 67 of a burnout time unit seen at 70 in FIG. 3. The channels 64–66 also include decoders or dividers 71–73 whose function is to produce timing signals of reduced frequency for application to voting logic 74 associated with each reactor pair. Such logic circuitry selects two out of three of the reduced frequency timing signals, which are alike in phase, for transmission of a corresponding waveform via the patch panel indicated at 76 in FIGS. 3 and 5 to programmer means 82 also seen in those figures. In this regard, one patch bay or panel 76 is associated with each reactor pair, and has separate input terminals 77 and 78 for main and auxiliary timing signals. Each panel also has an output terminal set 80 electrically connected at 79 with its associated programmer means, indicated generally at 82. Finally, each panel 76 includes patch connector means such as adjustable wiring 81 connectible between any selected terminal in the set 80, and any terminal in either of the sets 77 and 78. The different interconnectible terminals in the sets permit patching in such manner that each reactor will step at a fixed time in relation to the remainder of the reactors or furnaces.

FIG. 5 also illustrates typical components of the programmer means 82, as including a counter 83 and decode apparatus 84 interconnected at 85 to be responsive to main timing signal input at 79 for generating output step signals at terminals 87. The electronic counter output is typically in binary form, and the binary decode apparatus output appears at the terminals 87 indicated as steps 1, 1P, 2, 2P, 3, 3P, 4 and 4P, the letter "P" indicating "purge." Such output signals may be considered as generated stepping signals having predetermined time interrelation so as to open and close the valves described above to accomplish the cycle steps. From the terminals 87 the various stepping signals are appropriately and selectively wired at 90 to terminals 91 of a valve control unit 92, which is part of the operator means to operate the valves to assume their proper configurations and in step sequence. The operator means may also be considered to include the valve drivers D, such as solenoids, which drive the valves between open and closed positions. In this regard, the various steps for each reactor follow each other in time without interruption, most valves being automatically operated at the ends and beginnings of the steps; however, certain valves are independently controlled, as from the patch panel 76, so as to permit variation of their opening and closing times. For example, note the patch connection or lead 95 leading from the output panel section 96 to the terminal bank 97 of the valve control unit 92, terminals in bank 97 being connectible to the drives of selected valves via patching to terminals 91. The bank 96 includes a series of terminals 96a–96n to which timing signals are fed, there being appropriate circuitry to effect a phase displacement as between the timing signals applied to the different terminals 97a–97n associated with fuel valve opening. In similar manner, patch line 98 extending from patch panel terminal bank 99 to the bank 100 of the valve control unit, to allow independent adjustment of the time at which the main fuel valve $V_9$ closes, within each cycle, to vary the heating of the brickwork zones, thereby to vary the reaction undergone by the feed.

In this regard, the feed valve $V_{14}$ is always open at the end of the purge step. Referring to FIG. 3, the block 102 contains appropriate input-output circuitry including valve drivers and reed relays, being a part of the operator means responsive to the step signals to operate the valves. Connections from unit 102 to the valves are shown at 103. Finally, the spark plugs $SP_1$–$SP_4$ seen in FIG. 3a are controlled to operate with correct timing via signals transmitted by unit 102. Patch wiring 90 is adjustable to preselect valve positions in any one cycle. Burnout valves $V_7$, $V_8$, $V_{11}$ and $V_{12}$ and spark plugs $SP_1$–$SP_4$ only operate durin gthe time that the fuel valves $V_5$ and $V_9$ respectively are open, if burnout is in progress.

Also provided in the sequence control system is what is characterized as error detection means responsive to valve positioning and to versions of the timing signals to indicate whether the valves have assumed their intended configurations. Such error detection means typically includes valve movement limit switches, as for example are indicated at 105 in FIG. 5. Electrical outputs derived from such switches when the valves have reached intended open or closed positions are led as at 106 to the detector 107 which may for example comprise a comparator. The latter ascertains lack of time correspondence between the limit switch outputs and versions of the step signals fed to the detector at 108, and upon such lack of correspondence, an appropriate alarm is actuated at 109. The error detector circuitry is temporarily disabled during valve movement as by means including blanking signal transmission at 110 from the patch panel output 79 via a time delay unit 111, whereby error detection is activated only after the valves have had time to fully move to either open or closed position. Accordingly, the error detection unit assures a complete check of the functioning of the programmer means 82, the operator means including the units 92 and 102, the valve drivers, and limit switches. Also, provision is made via feedback at 102a and 102b in FIG. 3 for reactor shut-down (stoppage of timing signal transmission) in the event of error detection.

Referring to FIG. 3, it will be understood that the system time unit 50 supplies timing signals to all the reactor pairs. In addition to main timing signals provided by unit 51, the unit 50 also includes an auxiliary time unit 110 providing auxiliary timing signals to the patch panel input terminal bank 78, referred to above. Typically, the auxiliary unit includes only one channel of the type seen at 64, 65 and 66 in FIG. 4. Auxiliary timing signals are usable (substituted for main timing signals) to control any furnace or reactor undergoing test runs, and where the step times may be changed to determine optimum operating conditions. To enable this control, the patching means 81 is unplugged from the bank 77 and plugged into bank 78. Different terminals in the bank 78 receive the same timing signals from the unit 110.

Referring again to the burnout valving that controls supply of burnout fuel to the reactor, the latter is controlled as follows. Primary burnout timing means is associated with the main time unit and operable to provide timing signals controlling burnout initiation at multiple cycle embracing intervals (see timing signals at 115 and 115n in FIG. 2, and interval 116) and occurring during the time that a reactor is normally to be heated by fuel combustion. The timing signals also control duration (see $\Delta H$ in FIG. 2) of burnout, which is less than the total length of the HEAT step for the reactor under consideration. FIG. 3 illustrates typical burnout time units 70 and 117, providing a set of binary coded timing signals which are decoded to produce step outputs at 118 and 119 to the control 120, the latter also receiving step signal input from lead 145. Output from the control 120 is transmitted at 121 to the unit 92, from which the valves and spark plugs are controlled via unit 102. Burnout intervals 116 can be selected by the patch panel, as for example to a length of about 16 hours. Burnout duration within the heating step can be patch panel controlled to a maximum of say 30 seconds. Also, burnout can be controlled to repeat in each of several cycles and at the same step in each cycle. Time unit 70 is typically used to generate timing signals controlling the interval 116, whereas timer 117 generates signals controlling burnout duration in a step as well as the number of burnout repeats over several cycles.

An additional feature of the invention comprises an analyser for analysing samples of product fluid outputs of the different reactors inserted in the analyser, together with analyser control means responsive to the stepping signals to control insertion of samples at predetermined times during selected steps. For example a chromatograph analyser unit as indicated at 130 in FIG. 3a receives inputs from four lines 131–134 tapping the outputs of reactor pair $R_1R_2$, $R_3R_4$, $R_5R_6$ and $R_7R_8$, respectively. The control means typically includes the analyser programmer and path panel 135, the delay timer 136, the control panel 137 and output unit 138 having input-output connections 139–144 as indicated. The programmer 135 receives step signals via input lead 145 from the control unit 82 in addition to a set of binary coded time signals from timer 136, which operate in the control 135 to generate delay between step start and sample inject. In this regard, the programmer 135 controls sample stream selection and actual injection of the selected (from different of the lines 131–134) into the gas chromatograph, in such manner as to produce the reactor product analysis at a particular time within the MAKE step. In this regard, each reactor pair such as $R_1R_2$ has four MAKE steps, and with four consequent analyses. The patch panel at the programmer 135 allows selection of the time delay between MAKE step start and sample injection, the delay being the same for all four furnace pairs R₁R₂–R₇R₈ in the train. Control panel 137 provides indications of the product stream being analysed, selection of the stream to be scanned, and a manual override for stream selection. Feedback loop 250 via the control room analyser programmer 251 is used for control of completeness of sample injection.

Referring to FIG. 3, a master control panel and valve display 159 is shown as having input and return connections at 160 and 161 with the program control unit 82, input and return connections at 162 and 163 with the burnout control 120, and input and return connections at 160 and 161 with the program control unit 82, input and return connections at 162 and 163 with the burnout control 120, and input and return connections at 164 and 165 with the valve control unit 92. The function of the panel is to permit manual mode control of the reactor pairs. The control portion of panel 159 for two reactors $R_1R_2$ as seen in FIG. 6, has four reactor state indicators 166–169, corresponding to the steps 1–4 in FIG. 2, and individually and sequentially settable by repeated advancement of selection switch button 175. FIG. 6 also shows four additional indicators 170–173, corresponding to transmission of stepping signals to start steps 1–4, and an "enable" push button 176 which when manually operated "enables" that indicator of group 170–173 which corresponds to the set indicator of group 166–169. Thus, manual stepping is accomplished in two phases: first the operator advances the program advance button 175 as many times as necessary to achieve selection of the desired step as indicated by the arrows on the indicator in group 166–169; and that selected indicator lights up; next, the operator presses the enable button 176 and the indicator in group 170–173 just below the "set" indicator in group 166–169 lights up, showing that the control unit 82 has been instructed to transmit step signals corresponding to that selected step. However, the connections are such that a short reactor purge step is effected automatically before start of the desired HEAT or MAKE step.

FIG. 6 also shows provision of a push button switch 180 to start burnout manually at the step selected by advancement of button 175; a system "set" shut-down push button switch 181; an indicator light 182 which occurs in relation with indicators 116–169 to show respective purges; an indicator light 183 which occurs with indicators 170–173; a switch 184 operable to close the fuel valve $V_9$ on shut-down and an associated indicator 185 which lights up when the valve closes (as by energization from a circuit that includes the valve limit switch); and a switch 186 movable between system "automatic mode" and system "manual mode" positions for selection of the desired operation mode. An indicator 187 lights up differently in the two modes. Button 300 resets the shut-down control which is latching. A valve position display of indicators to show the actual positions of the various reactor associated valves may alos be provided as indicated in the lower portion of block 159 in FIG. 3.

Referring back to FIG. 3, a computer interface and computer block is indicated at 190 to provide a set of electrically isolated signals to the computer from the control system. The former signals inform the computer of the status of each reactor, of status changes and of analyzer sample injection. The latter signals control the delay in the analyser 135 between step start and sample inject.

Safety features of the system include a watch dog timer 200 in the main timer unit 51 which operates to trip the system to shut-off if a step does not occur within a preset interval of time (as for example may be due to line breakage, power failure, etc.). Also, selected high temperature on any of the thermocouples $TS_3$, $TS_4$, $TS_5$ or $TS_6$ in FIG. 3a will shut down the reactor pair (such as $R_1R_2$). Selected high temperature on either of the thermocouples $TS_1$ and $TS_2$ will close the fuel gas valve $V_5$ or $V_9$ on $R_1$ or $R_2$. Low temperature on either of $TS_1$ or $TS_2$ will prevent opening of the fuel valve in order to avoid filling the fuel gas system with combustibles if ignition cannot occur. Circuitry 103 and units 92 and 102 provide the interconnections between the thermocouples and valve drivers.

I claim:

1. In combination with pairs of first and second combustion reactors each having valve controlled inlets and outlets for fuel, air, product and purge fluids, a sequencer system for causing the valves to step through a sequence of configurations in each of repeated operating cycles, said configurations characterized in that the first and second reactors respectively receive fuel and feed fluid in a first step interval in the cycle, both reactors receive purge gas in a purge interval following said first step, the first and second reactors respectively receive feed and fuel in a second step interval in the cycle, and both reactors receive purge gas in a purge interval following said second step interval, said sequencer system including, a main time unit providing main timing signals to be used to define said step intervals and said cycles for said pairs of reactors, programmer means including counter and decoder apparatus connected to be responsive to said main timing signals for generating stepping signals, operator means responsive to said stepping signals to operate said valves to assume said configurations in step sequence, an auxlary time unit to provide auxiliary timing signals to be used to define other step intervals and other cycles, a patch unit associated with each pair of reactors and having separate input terminals for said main and auxiliary timing signals, and output terminal means electrically connected with said programmer means, the patch unit including patch connection means selectively electrically connectible between said output terminal means and either of said input terminals, whereby any selected reactor pair may be separately programmed for test purposes, and there being valving for controlling supply of burnout fuel to be combusted in each reactor, burnout timing means operable to provide timing signals controlling burnout initiation at multiple cycle embracing intervals and occurring during the time that a reactor is normally to be heated by fuel combustion, and also controlling the duration of burnout, and control means responsive to said burnout timing signals for operating said burnout control valving.

2. The combination of claim 1, including error detector means responsive to valve positioning and to versions of said main timing signals to indicate whether valves have assumed said configurations, said error detection means including valve movement limit switches from which electrical outputs are derived when the valves have assumed said configurations.

3. The combination of claim 2 including means to disable said error detection means during valve movement to said configuration.

4. The combination of claim 1 wherein said last named control means includes a patch panel through which said burnout timing signals are transmitted to said means for operating said burnout fuel control valving, said patch panel including a manually adjustable connection operable to select the burnout timing signals transmitted, for adjusting said interval between burnout initiation and said duration of burnout.

5. The combination of claim 1 including an analyser for analysing samples of product fluid outputs of different of said reactors inserted in the analyser, and analyser control means responsive to said stepping signals to control said insertion of said samples at predetermined times during selected steps.

6. The combination of claim 1 wherein the reactors have a sequence of states, related to said steps as follows:

|        | First reactor state | Second reactor state |
|--------|---------------------|----------------------|
| Step 1 | MAKE NORTH          | HEAT SOUTH.          |
| Step 2 | HEAT SOUTH          | MAKE SOUTH.          |
| Step 3 | MAKE SOUTH          | HEAT NORTH.          |
| Step 4 | HEAT NORTH          | MAKE NORTH.          | where, "HEAT" is defined as supply of air and fuel to a reactor for combustion therein,
"MAKE" is defined as supply of reactant feed to a reactor for reaction therein,
"NORTH" is defined as flow through the reactor in one direction,
"SOUTH" is defined as flow through the reactor in the opposite direction.

7. The combination of claim 6, including a master control panel having four reactor state indicators corresponding to selection of said Steps 1–4, means to set one of said indicators, form additional indicators corresponding to transmission of stepping signals to start Steps 1–4, and means to enable the additional indicator corresponding to the selected and set reactor state indicator.

8. The combination of claim 7 wherein the system has automatic and manual operating modes, said reactor state indicators defining selectors individually movable in manual operating mode to generate stepping signals, and said additional indicators defining enabling means movable in manual operating mode to enable communication of said selector generated stepping signals to said operator means.

References Cited

UNITED STATES PATENTS

| | | |
|---|---|---|
| 2,762,568 | 9/1956 | Sullivan. |
| 3,420,641 | 1/1969 | Milbourne et al. ___ 48—197 XR |
| 3,429,679 | 2/1969 | Pinkston et al. _____ 48—196 |

OTHER REFERENCES

Savas: "Computer Control of Industrial Processes," 1965, pages 331–332, and 336–337.

MORRIS O. WOLK, Primary Examiner

R. E. SERWIN, Assistant Examiner

U.S. Cl. X.R.

23—252, 254, 277; 48—197, 212, 214, 215; 235—151.1, 151.12